(No Model.) 2 Sheets—Sheet 1.
W. D. JOHNSON & T. A. CURTIS.
COUPLING FOR HOT WATER HEATING PIPES.
No. 447,329. Patented Mar. 3, 1891.
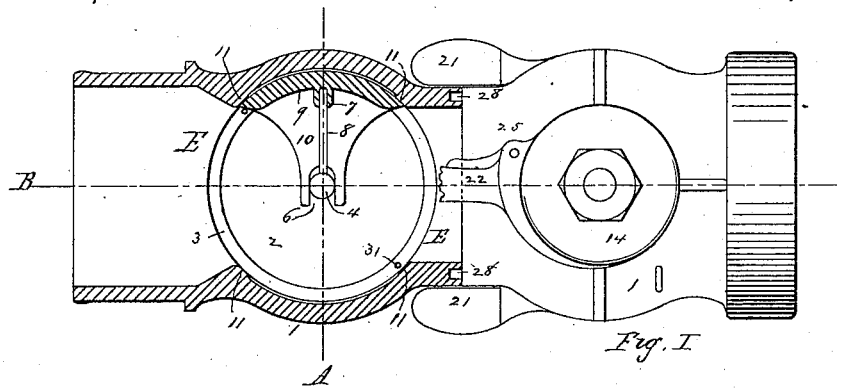
Fig. I.
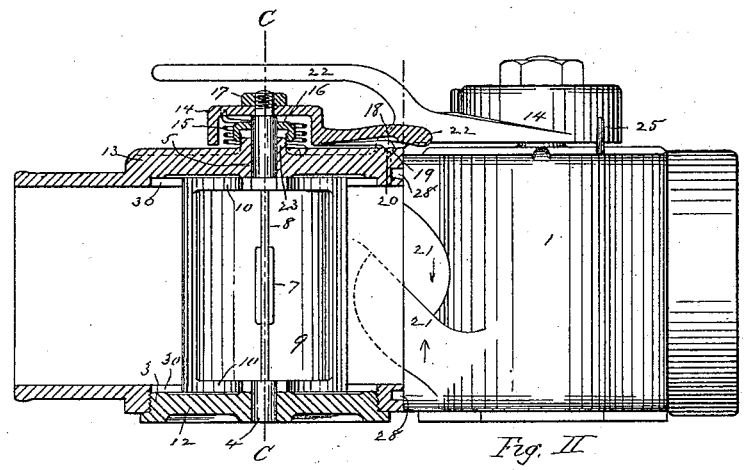
Fig. II.
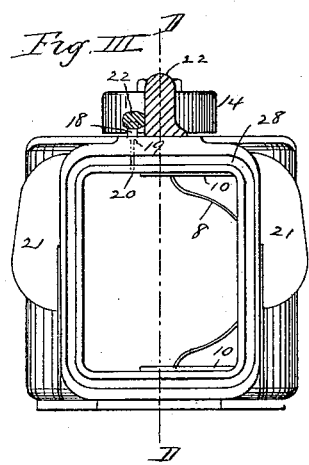
Fig. III.
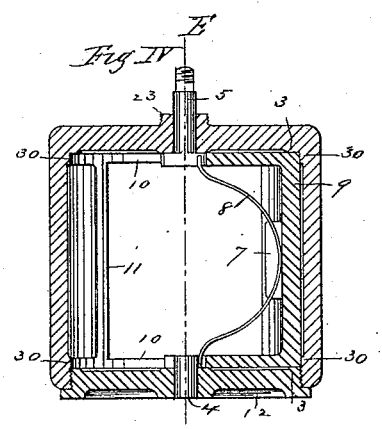
Fig. IV.
Witnesses.
E. E. Curtis.
E. G. Palmer.
William D. Johnson
Theodore A. Curtis } Inventors
By T. A. Curtis
their atty.
THE NORRIS PETERS CO., PHOTO-LITHO., WASHINGTON, D. C.

(No Model.) 2 Sheets—Sheet 2.
W. D. JOHNSON & T. A. CURTIS.
COUPLING FOR HOT WATER HEATING PIPES.
No. 447,329. Patented Mar. 3, 1891.
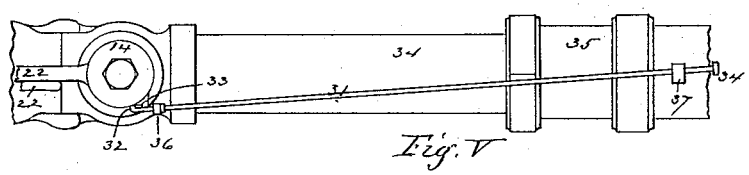
Fig. V.
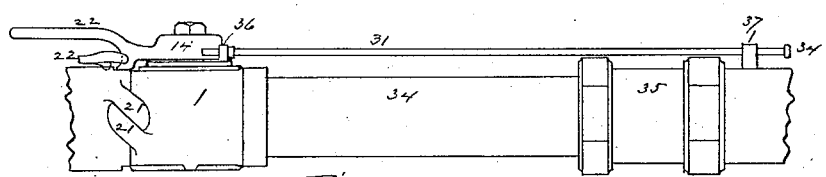
Fig. VI.
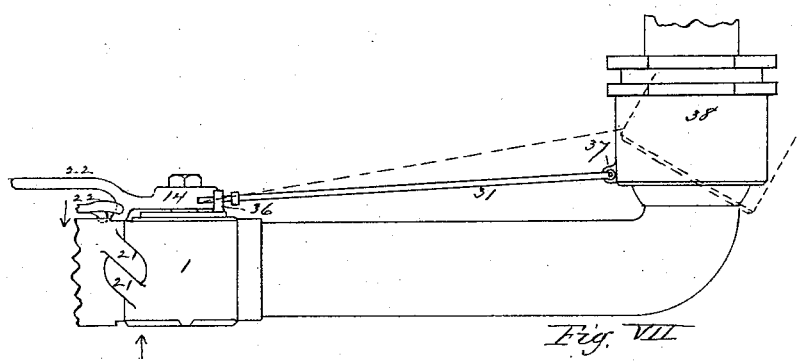
Fig. VII.
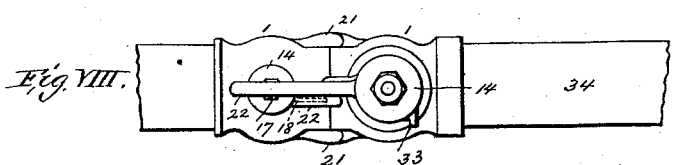
Fig. VIII.
Witnesses.
E. E. Curtis.
E. G. Palmer.
William D. Johnson
Theodore A. Curtis. Inventors.
By T. A. Curtis
their Atty.

UNITED STATES PATENT OFFICE.

WILLIAM D. JOHNSON, OF NEW HAVEN, AND THEODORE A. CURTIS, OF HARTFORD, CONNECTICUT.

COUPLING FOR HOT-WATER HEATING-PIPES.

SPECIFICATION forming part of Letters Patent No. 447,329, dated March 3, 1891.

Application filed August 12, 1890. Serial No. 361,780. (No model.)

*To all whom it may concern:*

Be it known that we, WILLIAM D. JOHNSON, of New Haven, in the county of New Haven and State of Connecticut, and THEODORE A. CURTIS, of Hartford, in the county of Hartford and State of Connecticut, have invented a new and useful Improvement in Couplings for Hot-Water Heating-Pipes, of which the following is a specification and description.

The object of our invention is to provide a coupling to connect the heating-pipes of two adjacent cars of a railway-train, the two parts of which coupling will be automatically disconnected and separated should the two cars be accidentally disconnected or detached from each other when moving, and which coupling also contains suitable valves, which will close automatically whenever the two parts of the coupling are automatically disconnected; and our invention consists of two cylindrical or partially cylindrical shells or cases, each provided with interlocking ears or lugs on the outside, and each containing a valve arranged to swing upon a pivot and operated by suitable mechanism, as hereinafter described, to hold the said valves open while the heating-pipes of said two cars are connected, as above mentioned, and to automatically close and keep closed the said valves whenever the two parts of the coupling are disconnected, all of which will be more fully hereinafter described and set forth, and shown in the accompanying drawings, in which—

Figure I shows one part of the coupling in plan and the other part in horizontal section at line D of Fig. III, both parts being connected and with the valve open to permit water to pass through the coupling. Fig. II shows the two parts connected, one part being in elevation and the other part in vertical section at line B of Fig. I, and with the valve open. Fig. III is an end elevation of one part of the coupling. Fig. IV is a transverse section at line C of the case and the valve therein. Fig. V is a plan or top view showing the coupling attached to a sliding jointed pipe. Fig. VI is a side view of the same; and Fig. VII is a side view of the coupling, showing the latter as attached to a ball-and-socket-jointed pipe. Fig. VIII is a plan view showing the relation of the valve-levers each to the other.

In the drawings, 1 represents the shell or case, which may be connected at one end with a water-pipe in any convenient manner, and at the other end is provided with inclined interlocking ears 21, formed thereon, so that when the straight inclined sides of the ears of one part of the coupling are placed over and upon the corresponding sides of the ears of the other part the two parts of the coupling will be brought and held firmly together by pressure applied against either one of the parts in a direction indicated by the arrows.

The case 1 is made of cylindrical form at the sides, with one end made open to receive the valve 9, which end is threaded and a threaded plug 12 is turned thereinto, said plug being recessed on the inside, except around the outer edge at 3, and except also around the pivot 4, which places are finished to furnish a bearing for the valve 9 to turn upon, and the opposite end of the case is made in the same manner, so that the valve may have a minimum amount of friction in its circular movement. The inner cylindrical or concave surface of the case is recessed in the same way, being finished only for a short distance above its lower end and below its upper end, as shown at 30 in Figs. II and IV, and is finished also vertically for a short distance each side of the water-passage, as shown at 11, to diminish the friction in the movement of the valve, the cylindrical finished surface of the valve moving against these finished surfaces.

The valve 9 is made in the form of a segment or a sector in its cross-section, as shown in section in Fig. I, being of about the fourth part of a cylinder in form and finished on the outside to fit the finished surfaces at 30, 11, and 3 of the case, and is provided with arms 10 at the upper and lower ends, the end of the upper arm having a vertical slot therein which strides and fits the lower prismatic end of the pivot 5, which extends up through the upper part of the case, so that that end of the arm may slide to and fro on that end of said pivot, but so that said valve may be partially turned or rotated in either direction by said pivot when the latter is rotated, and the end of the lower arm 10 is also slotted to stride and slide upon the rounded upper end of the pivot 4 in the lower part of the case. A small bent spring 8, whose lower end presses against the pivot 4 and the upper end in a recess near the pivot 5, bears against the valve to keep it always pressed outward against its seat when being moved to open or close the water-passages through the case.

Around the pivot-hole of the upper part of each case of the coupling is raised a central boss 23, which is threaded to receive a cap 16, through which extends the upper end of the pivot, the inside of the cap forming a packing-box which is packed with suitable material. The upper or outer end of each pivot 5 is adapted to receive a hood 14, which is secured firmly to the pivot by a nut 17, turned onto the outer threaded end of the pivot and snugly against the hood 14, or by any other convenient fastening. Between the hood 14 and the upper end of each case is a spiral spring 15, with one end secured to the hood and the other end secured to the case.

Each hood 16 is provided with a projecting lever 22, to the lower or inner side of one of which is secured a spring-detent 18, whose outer end is adapted to fit and enter an indent or small recess 19 made in the upper part of the case near the end, and from this recess or indent a small hole 20 may be made through the case communicating with the inside, as is shown in Fig. III. The other and longer lever 22 is made so that when in the position shown in the drawings its inner side bears upon the opposite half or case of the coupling and holds the two parts of the coupling together or prevents the interlocking ears 21 from being accidentally disengaged, and when the levers 22 are placed lengthwise the pipe they are in a position side by side, as shown in section in Fig. III and in plan view in Fig. V, and if the long lever or handle 22 be moved toward and against the other and shorter one sufficiently to cause the detent 18 to move out of the recess or indent 19 each spiral spring 15 quickly closes its valve.

When the levers 22 are in a position shown in Fig. II, or extending in the same direction as the pipe to which the couplings are attached, the valves 9 are in a position at right angles to the levers, so as to leave the water-ways E open, as shown in section in Fig. I, and when once placed in this position said levers are held there by the spring-detent 18 in the recess 19; but if the levers are pushed to one side sufficiently to raise the spring-detent out of the recess the force of each spiral spring 15 quickly throws its valve around on the pivots 4 and 5 into a position to close the water-ways E, as shown in dotted lines in Fig. I, each valve moving into its position against a stop 31, placed there for that purpose.

One part of the coupling, having the longer lever 22 with a lug or catch 33 made thereon, is attached to a short piece of hose, ordinarily secured to the end of the water-pipe, between two adjacent cars of a railway-train, or to the ordinary well-known sliding-jointed pipe, or to a ball-and-socket-jointed pipe, (either of these devices for connecting the piping may be used,) and a chain or rod 38, with a hook 32 at one end, is supported near this hooked end by a guide 36, fixed on the coupling or upon the sliding part of the pipe, and near the other end, upon which is a shoulder or protuberance 34, by another guide 37, fixed on the stationary part of the pipe, as shown clearly in Figs. V and VI. If a ball-and-socket-jointed pipe is used, this latter guide is fixed on the movable or tilting part of the joint, as shown clearly in Fig. VII, so that if the two adjacent cars of a train be accidentally uncoupled the chain or rod 38 will be pulled lengthwise and its hooked end will strike against the lug 33 and turn the hood sufficiently to cause the long lever 22 to move against the short lever 22 enough to disengage the detent 18 from its recess or indent 19, when the spring 15 in each hood or drum 14 will instantly turn the pivot 4 into a position to shut each valve 9 and close the water-passage through the coupling. At the instant the levers 22 are turned to one side the pressure to hold the two parts of the coupling together is removed, and as the two parts of the coupling are pulled from each other the ears 21 disengage and the parts of the coupling separate, with the valve in each part closed, which prevents the escape of water from the pipes. If the parts are uncoupled by hand, the operator moves the long lever 22 to one side, which also moves the shorter one sufficiently to disengage the detent 18 from its recess 19, when both the valves are quickly closed by the spring 15, as before.

Any ordinary or convenient packing may be used between the two parts of the coupling to make it water-tight, and, if desired, a groove or channel 28 may be made in the vertical face of one or both parts of the coupling, into which groove may be inserted any good packing material, and the small hole 20, extending through the end of the coupling and communicating with the bottom of the recess 19, also communicates with the groove or channel, so that when the two parts of the coupling are placed together and one of the levers 22 turned into the position shown in Fig. II that valve is opened and the water is free to pass through into the space between the two valves of the coupling, and the air which is therein is forced out through the small hole 20, and when this is done the other lever 22 is also turned into the position shown in Fig. II, with the detent in its position in its recess 19, which completely stops the hole, and the pressure of the water in the pipes then forces the water into the hole 19 and thence into the channel 28 behind the gasket or packing, forcing the latter outward against the end of the other part of the coupling or the packing therein and making a tight joint and also causing the packings to perfectly fil their grooves laterally.

At the rear end of the rear car of a train a short piece of hose with this coupling attached may be used to connect the flow and return pipes, so that the hot water may pass from the flow-pipe through the hose and coupling and into the return-pipe, and so back to the heater.

Having thus described our invention, what we claim as new is—

1. In a valve-coupling for pipes, the combination of two cases or shells, each provided with ears 21, which interlock with each other, and a pivoted rotating valve in each shell, each valve operated by a lever secured to its pivot outside of the shell or case, and the two cases held together by the valve-lever of one of the cases extending over and against the adjacent end of the opposite case, and by the interlocking ears, substantially as described.

2. In a valve-coupling for pipes, the combination of two shells or cases, each provided with interlocking ears 21, a pivoted rotating valve 9 in each case, a lever 22, connecting with each valve, and both levers in engagement when the valves are open, a spring detent or catch connected with one of said levers for holding the valves open, and an actuating-spring connected with each valve and its case for closing said valves, substantially as described.

3. In a valve-coupling for pipes, the combination of two shells or cases, one provided with an orifice 20 for the escape of air from the space between the two valves, a valve 9, pivoted in each shell and adapted to partially rotate therein, a lever connected with the pivot of each valve for operating the same, and a spring-detent adapted to close said orifice when the valves are fully opened, substantially as described.

WM. D. JOHNSON.
THEODORE A. CURTIS.

Witnesses to signature of Wm. D. Johnson:
GEORGE E. PALMER,
J. H. HERDMAN.

Witnesses to signature of Theodore A. Curtis:
ISAIAH BAKER, Jr.,
FREDK. W. NEUSHAFER.